(12) United States Patent
Clabau et al.

(10) Patent No.: US 10,023,493 B2
(45) Date of Patent: Jul. 17, 2018

(54) TEMPERABLE ENAMELLED GLASS

(71) Applicant: SAINT-GOBAIN GLASS FRANCE, Courbevoie (FR)

(72) Inventors: Frédéric Clabau, Paris (FR); Louis Garnier, Paris (FR); Vincent Rachet, Montrouge (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 463 days.

(21) Appl. No.: 14/417,315

(22) PCT Filed: Jul. 25, 2013

(86) PCT No.: PCT/FR2013/051787
§ 371 (c)(1),
(2) Date: Jan. 26, 2015

(87) PCT Pub. No.: WO2014/016518
PCT Pub. Date: Jan. 30, 2014

(65) Prior Publication Data
US 2015/0175480 A1 Jun. 25, 2015

(30) Foreign Application Priority Data

Jul. 27, 2012 (FR) ..................... 12 57307

(51) Int. Cl.
*B32B 15/04* (2006.01)
*B32B 17/06* (2006.01)
*C03C 17/22* (2006.01)
*C03C 17/00* (2006.01)

(52) U.S. Cl.
CPC ............ *C03C 17/22* (2013.01); *C03C 17/007* (2013.01); *C03C 2217/45* (2013.01); *C03C 2217/485* (2013.01); *Y10T 428/259* (2015.01); *Y10T 428/26* (2015.01)

(58) Field of Classification Search
USPC ................................ 428/426, 428, 432, 688
See application file for complete search history.

(56) References Cited

U.S. PATENT DOCUMENTS

| 1,941,990 | A | | 1/1934 | Lindstrom et al. |
| 4,514,456 | A | | 4/1985 | Deal et al. |
| 5,510,188 | A | * | 4/1996 | Vockler ............. C04B 35/62222 106/600 |
| 5,702,520 | A | | 12/1997 | Boaz |
| 5,891,238 | A | * | 4/1999 | Griffith ................. C04B 14/303 106/286.2 |
| 6,428,616 | B1 | * | 8/2002 | Neely, Jr. ................ C03C 17/22 106/628 |
| 6,589,661 | B2 | * | 7/2003 | Neely, Jr. ................ C03C 17/22 106/623 |
| 2003/0186799 | A1 | * | 10/2003 | Beyrle ...................... C03C 8/02 501/14 |
| 2011/0293923 | A1 | * | 12/2011 | Schmidt ............. C23C 18/1208 428/329 |

FOREIGN PATENT DOCUMENTS

| WO | 96/30450 | | 10/1996 |
| WO | 98/28370 | | 7/1998 |
| WO | 2006/111359 | A1 | 10/2006 |
| WO | 2007/104752 | A1 | 9/2007 |
| WO | 2007/135192 | A1 | 11/2007 |
| WO | 2011/051459 | A1 | 5/2011 |
| WO | 2011/095471 | A1 | 8/2011 |

OTHER PUBLICATIONS

International Search Report issued in International Patent Application No. PCT/FR2013/051787, dated Oct. 1, 2013.

* cited by examiner

*Primary Examiner* — Lauren R Colgan
(74) *Attorney, Agent, or Firm* — Pillsbury Winthrop Shaw Pittman LLP

(57) ABSTRACT

A colored lacquered substrate made of glass or glass-ceramic includes a mineral coating based on alkaline silicate, which achieves the required performance in terms of color and of change in color during tempering, and in terms of adhesion and of mechanical strength at low temperatures without requiring a high-temperature baking step.

18 Claims, No Drawings

TEMPERABLE ENAMELLED GLASS

CROSS-REFERENCE TO RELATED APPLICATIONS

This application is the U.S. National Stage of PCT/FR2013/051787, filed Jul. 25, 2013, which in turn claims priority to French Application No. 1257307, filed Jul. 27, 2012. The contents of all of these applications are incorporated herein by reference in their entirety.

The subject of the present invention is a substrate made of glass or glass-ceramic that is lacquered, temperable and intended to be used in the field of building interiors and/or exteriors, and its manufacturing process. Lacquered glass is especially intended to decorate the walls of buildings or the fronts of furnishings.

There are currently two main types of coating allowing a lacquered glass to be obtained that has an opaque and colored aspect. The first consists in coating the glass substrate with an organic paint, mainly comprising a mixture of a resin and organic or inorganic pigments. The second consists in melting, on the substrate to be coated, an enamel, obtained from a glass frit, from inorganic pigments and from a resin that disappears when heated.

The main drawback of coatings based on organic paint resides in the fact that the substrates thus coated cannot be subjected to a thermal tempering. The expression "thermal tempering" is understood to mean that the substrate is heated to a temperature above 600° C. in air for a few minutes before being rapidly cooled. These conditions are much too aggressive for organic coatings, which then degrade into elementary compounds (carbon, carbon dioxide, etc.).

The mechanical strength of glass is considerably increased by thermal tempering, Tempered glass furthermore has the advantage of fragmenting into a multitude of small unsharp fragments when broken. Glass coated with organic paint cannot therefore have such properties (especially according to safety standard EN 12150-1:2000) unless the paint is applied to a previously tempered glass sheet, and therefore to a sheet with the definitive dimensions since the latter cannot be cut without breaking. Since mass manufacturing is uncommon in interior design where dimensions are often customer-specific, organic paints are above all associated with untempered glass, which has poorer mechanical properties.

The drawback of enamels is that the layer deposited on the substrate has, before it is melted, a very low mechanical strength and hydrolytic resistance. It is therefore not possible to transport, store, cut, trim or wash glass coated with an enamel unless it has been heated to a high temperature, typically above 600° C., and unless the deposited layer has melted. However, once glass has been tempered it cannot be worked, unless an additional step of detempering is carried out. Therefore, the enamel must necessarily be deposited on panels having the definitive dimensions. As mentioned above, this type of product is unsuitable for interior design applications in which the dimensions are often customer-specific.

To increase the mechanical resistance of unmelted enamel, patent application WO 2007/104752 describes a bilayer system in which a resin layer is deposited on an enamel layer. This system requires many industrial steps since it is necessary to consolidate the first layer before the second can be deposited. There is also a high risk of the enamel layer being degraded during the deposition of the resin layer. Lastly, the amount of resin in this bilayer system is relatively large and it is difficult to eliminate all of the resin used during the tempering, black marks possibly appearing on the coated substrate as a result. Patent application WO 2011/095471 thus provides a particular tempering process for this type of system.

Another possibility envisioned for improving the mechanical resistance of the unmelted enamel consists in increasing the amount of resin. Mention may be made, by way of example, of patent applications WO 2007/135192 or WO 2011/051459. The main problem with these layers is a low adhesion to the glass in the presence of water, thereby frequently leading to delamination of the colored layer during conventional steps of trimming or drilling of the coated substrate. A second potential problem is the appearance of flames in the tempering furnace, the resistive heaters of the furnace even possibly being degraded thereby.

Parallel to these two technical solutions, patent application WO 2006/111359 describes the deposition of pigment-containing sol-gel layers on glass substrates. The problem with these systems is opaqueness, since it is known that sol-gel layers have a tendency to crack once their thickness exceeds a few microns. However, the opaqueness required for the desired applications is not obtained with such thicknesses. It is in fact necessary to deposit an additional opacifying layer, which merely transfers the problems of tempering resistance and mechanical strength of the lacquered glass before tempering.

U.S. Pat. No. 5,510,188 describes applying to glass a composition especially comprising a pigment and a solution of alkaline silicates and feldspar. The application of this coating requires a two-step heat treatment, the final curing step being carried out at a temperature between 500 and 760° C. This high-temperature treatment is required to obtain the desired resistance and adhesion properties.

With the objective of replacing enamels, patents EP 0 815 176 and EP 0 946 654 describe paint compositions based on alkaline silicates exhibiting a good adhesion to glass by virtue of the presence of low-melting-point glass frit and/or zinc oxide powder. This type of coating is completely cured and exhibits the desired adhesion only after it has been heated to a temperature above 550° C. Moreover, the glass frit present in these compositions may, when it melts during the high-temperature heat treatment, trap additives or organic impurities (surfactants, impurities contained in fillers and pigments, etc.). Burning partially, these additives or organic impurities leave black residues, and therefore they are confined to use with only very dark paints, as is the case in the aforementioned patents.

Therefore, it would be desirable to develop a lacquered glass or glass-ceramic substrate that has the required opaqueness, without a high-temperature heat treatment of the coated substrate being required, while remaining transportable, storable, cuttable, trimmable, washable and temperable. It would also be desirable to develop a product that employs a potentially light-colored paint the color of which changes only very slightly during the thermal tempering process. It is in this context that the present invention was developed.

The inventors have discovered that it is possible to obtain opaque colored lacquered glass by applying a mineral coating based on alkaline silicate, which achieves the required performance in terms of color and of change in color during tempering, and in terms of adhesion and of mechanical strength at low temperatures without requiring a high-temperature baking step.

The present invention describes a temperable lacquered glass or lacquered glass-ceramic substrate coated, over some or the entirety of at least one of its faces, with an opaque coating layer, characterized in that said layer, applied directly to the substrate, is a mineral paint based on an aqueous alkaline silicate solution comprising between 10 and 55% by weight sodium silicate, potassium silicate and/or lithium silicate, mineral fillers and at least one pigment, the lightness of the layer being such that, measured in reflection, the L* component is higher than or equal to 20, and such that the color difference between the substrate coated with said layer before tempering and the substrate coated with said layer after tempering is such that the parameter $\Delta E^*$, defined by $\Delta E^* = \sqrt{(\Delta L^*)^2 + (\Delta a^*)^2 + (\Delta b^*)^2}$, is lower than or equal to 5.0, $\Delta L^*$, $\Delta a^*$ and $\Delta b^*$ representing the variations in the L*, a* and b* color coordinates measured on the coated substrate before and after tempering.

Another subject of the present invention is the process for manufacturing such a temperable lacquered substrate.

The coating layer deposited on the glass or glass-ceramic substrate is a water-based mineral paint based on alkaline silicate, which is preferably devoid of adhesion promoter. The layer of paint is applied directly to the substrate, without applying any underlayer allowing adhesion to be improved.

The L*, a* and b* color coordinates are calculated under illuminant D65 and using a CIE 1931 standard observer. It is a question of the color coordinates obtained by reflection from the substrate side, i.e. on the side of the face opposite the coating. The L* component defines lightness, which ranges from a value of 0 for black to a value of 100 for white. It is measured in reflection. The a* and b* components represent ranges of colors.

The lightness of the coating layer is preferably such that the L* value measured in reflection is higher than 50.

The substrate thus coated has the required characteristics before undergoing a thermal tempering. Therefore it is transportable, storable, cuttable, trimmable and washable immediately after the coating layer has dried.

The substrate according to the present invention especially has the advantage of not changing color, or of changing color only sightly, when it is tempered.

The variation in the parameter $\Delta E^*$ is preferably smaller than 2 and even more preferably smaller than 1.

In addition, the coating layer especially exhibits, after drying at a temperature below 500° C., an adhesion to the substrate, measured by the lattice test of standard ISO 2409:2007, lower than or equal to 2 and even lower than or equal to 1.

The coated substrate is "temperable" such that the lacquered substrate may meet safety standard EN 12150-1: 2000.

The mineral paint used in the present invention is an aqueous solution based on alkaline silicates, also known as liquid glass or soluble glass.

Preferably, the mineral paint comprises between 10 and 55% by weight, and preferably between 15 and 45% by weight, sodium silicate, potassium silicate and/or lithium silicate. Even more preferably, the amount of alkaline silicates is comprised between 15 and 25% by weight. This moderate amount of silicate especially allows the desired opaqueness and viscosity to be obtained.

Sodium or potassium silicates are preferred for reasons of raw material cost. Even more preferably, the paint comprises between 10 and 55% by weight, preferably between 15 and 45% by weight and even more preferably between 15 and 25% by weight potassium silicates. This is because these compounds are more resistant to hydrolysis than sodium silicates and therefore allow a more resistant coating to be produced.

The paint also comprises at least one organic or inorganic pigment giving the coating layer the desired color. The pigment, preferably in powder form, may be inorganic, such as for example oxides of titanium, silicon, copper, aluminum, chromium, cobalt, iron, manganese and/or barium, zinc sulfide, cerium sulfide and/or cadmium sulfide, titanates of nickel and/or chromium, or bismuth vanadate, depending on the desired color.

When the pigments are of nature to yield dark hues, their concentration is limited. Thus, preferably, when the pigments are chosen from oxides of copper, iron, nickel and/or cobalt, they represent less than 20% by weight of the mineral paint.

The mineral paint comprises mineral fillers other than the inorganic pigments, these fillers being chosen from magnesium silicates such as talc, alumina, limestone, kaolin, clay and barium sulfate. The amount of fillers in the composition of the layer may range up to 60% by weight.

Advantageously, the weight ratio of the alkaline silicates to the mineral particles is lower than 1:1, said mineral particles consisting of the mineral fillers and the inorganic pigments. Preferably, this ratio is lower than 0.8:1 and even more preferably than 0.66:1. The amount of mineral particles present in the paint represents 1.25 times, preferably 1.5 times, the amount of alkaline silicates present. In this way it is possible to obtain the coating opaqueness required for the desired application.

The mineral paint may furthermore comprise between 0 and 5% by weight and preferably less than 3% by weight of a dispersing agent, an anti-foaming agent, a thickening agent, a stabilizing agent and/or a curing agent. The dispersing, anti-foaming and thickening agents may especially be present in amounts comprised between 0.01 and 5% by weight of the paint and preferably between 0.01 and 1% by weight.

The curing agent may especially be a phosphate or a hydroxide of aluminum. Mention will be made, for example, of the Fabutit® products from the company Chemische Fabrik Budenheim KG.

By way of dispersing agent, mention may be made for example of the compound Tego 740® from the company Evonik.

By way of anti-foaming agent, mention may for example be made of the compound Foamex® from the company Evonik.

The thickening agent may for example be the compound Betolin V30® from the company Woellner.

By way of stabilizing agent, mention may be made for example of the compound Betolin Q40® from the company Woellner.

Advantageously, the mineral paint may comprise an additive capable of liberating oxygen during the drying of the layer or the tempering of the product, especially when the substrate is heated to a temperature above 350° C., thus limiting any blackening effect due to the burning of organic products which may be present in small amounts via the rheological additives or impurities in organic powders. This additive may be chosen from a nitrate, a carbonate or an alkaline sulfate. This additive may also be an organic compound, of high oxidizing power, such as an oxalate or a polylactate. When it is present, this additive is in an amount comprised between 0.01 and 5% by weight and preferably between 0.1 and 3% by weight. Preferably, the additive capable of liberating oxygen is an alkaline nitrate present in an amount comprised between 0.1 and 3% by weight. This additive is very advantageously compatible with the Environmental, Health and Safety criteria currently in force.

When it is desired to obtain a white color, i.e. a coating possessing a lightness L* measured in reflection higher than or equal to 60, the additive capable of liberating oxygen is necessarily present. Thus, when the lightness L* of the layer measured in reflection is higher than 60, the mineral paint comprises between 0.1 and 3% by weight of said additive.

The coating layer has the advantage of using materials that are commonly found on the Earth's surface, inexpensive and compatible with Environmental, Health and Safety (EHS) criteria. Compatibility with EHS criteria is essential.

Advantageously, the mineral paint comprises particles that are smaller than 5 μm and preferably smaller than 2 μm in size in order to increase opaqueness.

The coating layer deposited on the substrate has a thickness of at least 10 μm. Typically, the layer is 50 μm thick.

The present invention also relates to the process for manufacturing a lacquered glass or glass-ceramic substrate, characterized in that it comprises steps of:
a. depositing a coating layer based on a mineral paint comprising an aqueous alkaline silicate solution, mineral fillers and at least one pigment over the entirety or some of at least one of the faces of said substrate, said paint preferably being devoid of adhesion promoter; and
b. drying said layer, in a single step, at a temperature such that the coated substrate undergoes no mechanical deformation and remains cuttable.

The coating layer may be deposited by any technique known to those skilled in the art of wet deposition processes. Mention will be made, for example, of spraying, roll coating, curtain coating, laminar flow coating or screen printing.

The drying step is preferably carried out at a temperature below 500° C. and even more preferably below 400° C., even below 200° C. The drying time is generally lower than 15 min and preferably lower than 10 min. The temperature rise during the drying step is achieved with a ramp lower than 100° C./min, and preferably comprised between 70 and 90° C./min.

Steps a) and b) of the process allow a lacquered substrate having a perfectly adherent coating exhibiting a good mechanical strength and the desired aesthetic aspect to be obtained.

The manufacturing process of the lacquered substrate may furthermore comprise a subsequent optional thermal tempering step at a temperature of at least 550° C. if it is desired to make the substrate comply with safety standards.

The mineral paint used in the process according to the present invention is an aqueous solution based on alkaline silicates, also known as liquid glass or soluble glass. This paint comprises between 10 and 55% by weight, preferably between 15 and 45% by weight and even more preferably between 15 and 25% by weight sodium silicate, potassium silicate and/or lithium silicate. Sodium or potassium silicates are preferred for reasons of raw material cost. Even more preferably, the paint comprises between 10 and 55% by weight, preferably between 15 and 45% by weight and even more preferably between 15 and 25% by weight potassium silicates. The paint also comprises at least one organic or inorganic pigment giving the coating layer the desired color. The pigment, preferably in powder form, may be inorganic, such as for example oxides of titanium, silicon, copper, aluminum, chromium, cobalt, iron, manganese and/or barium, zinc sulfide, cerium sulfide and/or cadmium sulfide, titanates of nickel and/or chromium, or bismuth vanadate, depending on the desired color.

The mineral paint comprises mineral fillers chosen from magnesium silicates such as talc, alumina, limestone, kaolin, clay and barium sulfate. The amount of fillers in the composition of the layer may range up to 60% by weight.

Advantageously, the weight ratio of the alkaline silicates to the mineral particles is lower than 1:1, said mineral particles consisting of the mineral fillers and the inorganic pigments. Preferably, this ratio is lower than 0.8:1 and even more preferably than 0.66:1. The amount of mineral particles present in the paint represents 1.25 times, preferably 1.5 times, the amount of alkaline silicates present. In this way it is possible to obtain the coating opaqueness required for the desired application.

The mineral paint may furthermore comprise between 0 and 5% by weight and preferably less than 3% by weight of a dispersing agent, an anti-foaming agent, a thickening agent, a stabilizing agent and/or a curing agent. The dispersing, anti-foaming and thickening agents may especially be present in amounts lower than 1% by weight.

The mineral paint may comprise an additive capable of liberating oxygen during the drying of the layer or the tempering of the product, especially when the substrate is heated to a temperature above 300° C., thus limiting any blackening effect due to the burning of organic products which may be present in small amounts via the rheological additives or impurities in organic powders. This additive may be chosen from a nitrate, a carbonate or an alkaline sulfate. This additive may also be an organic compound, of high oxidizing power, such as an oxalate or a polylactate. When it is present, this additive is in an amount comprised between 0.01 and 5% by weight and preferably between 0.1 and 3% by weight.

Advantageously, the mineral paint comprises particles that are smaller than 5 μm and preferably smaller than 2 μm in size in order to increase opaqueness.

The examples below illustrate the invention, without limiting the scope thereof.

EXAMPLES

Example 1

A water-based mineral paint composition was prepared by mixing 20% by weight of a K42T® potassium silicate solution from the company Woellner with 28.6% by weight water and 10% by weight titanium oxide (pigment). The following additives were also added:
7% by weight talc (Jetfine A1® from the company Rio Tinto Minerals)
30% by weight alumina (CTC 20® from the company Almatis)
3% by weight of a curing agent (Fabutit 206® from the company Chemische Fabrik Budenheim KG)
0.1% by weight of an antifoaming agent (Foamex 825® from the company Evonik)
0.1% by weight of a thickening agent (Betolin V30® from the company Woellner)
0.3% by weight of a dispersing agent (Tego 740® from the company Evonik)
1% by weight potassium nitrate.

The composition thus prepared was applied by film coater to a glass substrate, then dried at 150° C. for 10 minutes.

The layer obtained had a thickness of about 50 μm. It had an L* measured in reflection of 95.7. It was particularly hard and no scratches visible from the glass side were produced when a force lower than 4 N was applied by sclerometer. The coating layer had a good adherence to the glass substrate: a score of 1 was obtained in the standardized lattice test (ISO 2409:2007) and no debonding was observed in the post-soak adhesion test. This test, which was developed by the Applicant company, consists in submerging the sample for 3 minutes in demineralized water, then in drying it by dabbing a dry cloth over the surface of the paint, then in applying and removing the standardized adhesive tape used for the lattice test. This test makes it possible to evaluate the adhesion in steps of trimming and washing the lacquered glass.

The substrate thus coated may be tempered at a temperature of 650° C., for 10 minutes, without significant loss of hardness, color, or adhesion properties. In particular, the color change ΔE* between untempered and tempered layers is 2.0.

Example 2

A water-based mineral paint composition was prepared by mixing 20% by weight of a K42T® potassium silicate solution from the company Woellner with 31.6% by weight water and 10% by weight titanium oxide (pigment). The following additives were also added:
7% by weight talc (Jetfine A1® from the company Rio Tinto Minerals)
30% by weight alumina (CTC 20® from the company Almatis)
0.1% by weight of an antifoaming agent (Foamex 825® from the company Evonik)
0.1% by weight of a thickening agent (Betolin V30® from the company Woellner)
0.3% by weight of a dispersing agent (Tego 740® from the company Evonik)
1% by weight potassium nitrate.

In the same way as in example 1, the composition thus prepared was applied by film coater to a glass substrate, then dried at 150° C. for 10 minutes.

The layer obtained was still about 50 μm in thickness, and its L* measured in reflection was 96.2. No scratches visible from the glass side were produced when a force lower than 48 N was applied by sclerometer. The layer obtained a score of 1 in the standardized lattice test and no debonding was observed in the post-soak adhesion test.

The substrate thus coated may again be tempered at a temperature of 650° C. for 10 minutes without significant loss of hardness, color, or adhesion properties. The ΔE* between untempered and tempered layers was 1.7, and the coating layer contained no blackened zones after tempering.

Comparative Example

By way of comparison similar tests were carried out on a Lacobel T Cool White® coated glass substrate from the company AGC in its untempered form. The enamel layer contained a large amount of resin, allowing it to resist scratching up to 4 N. In contrast, this layer adhered weakly to the substrate: score of 4 in the standardized lattice test and debonding of 25% in the post-soak adhesion test. The ΔE* between the untempered and tempered layers was moreover 6.1.

The invention claimed is:

1. A temperable lacquered substrate made of glass or lacquered glass-ceramic coated, over the entirety or some of at least one of its faces, with an opaque coating layer, wherein said layer, applied directly to the substrate, is a mineral paint based on an aqueous alkaline silicate solution comprising between 10 and 55% by weight sodium silicate, potassium silicate and/or lithium silicate, mineral fillers and at least one pigment, the lightness of the layer being such that, measured in reflection, the L* component is higher than or equal to 20, and such that the color difference between the substrate coated with said layer before tempering and the substrate coated with said layer after tempering is such that the parameter ΔE*, defined by $\Delta E^* = \sqrt{(\Delta L^*)^2 + (\Delta a^*)^2 + (\Delta b^*)^2}$, is lower than or equal to 5.0, ΔL*, Δa* and Δb* representing the variations in the L*, a* and b* color coordinates measured on the coated substrate before and after tempering, wherein the mineral paint comprises an additive liable to liberate oxygen at a temperature above 300° C., said additive being chosen from an alkaline nitrate or an alkaline sulfate.

2. The substrate as claimed in claim 1, wherein the mineral paint is devoid of adhesion promoter.

3. The substrate as claimed in claim 1, wherein the pigment is organic or inorganic.

4. The substrate as claimed in claim 3, wherein the pigment is inorganic and wherein the weight ratio of the alkaline silicates to mineral particles is lower than 1:1, said mineral particles consisting of the mineral fillers and the inorganic pigments.

5. The substrate as claimed in claim 1, wherein the mineral fillers are chosen from magnesium silicates, alumina, limestone, kaolin, clay and barium sulfate.

6. The substrate as claimed in claim 1, wherein the mineral paint furthermore comprises at least one agent selected from the group consisting of a dispersing agent, an anti-foaming agent, a thickening agent, a stabilizing agent, a curing agent and any mixture thereof.

7. The substrate as claimed in claim 6, wherein said at least one agent is present in an amount comprised between 0.01 and 5% by weight of the paint.

8. The substrate as claimed in claim 7, wherein the amount of said at least one agent is between 0.01 and 1% by weight.

9. The substrate as claimed in claim 1, wherein the mineral paint comprises particles that are smaller than 5 μm in size.

10. The substrate as claimed in claim 9, wherein the mineral paint comprises particles that are smaller than 2 μm in size.

11. The substrate as claimed in claim 1, wherein the layer of mineral paint has a thickness of at least 10 μm.

12. The substrate as claimed in claim 11, wherein the layer of mineral paint has a thickness of at least 50 μm.

13. The substrate as claimed in claim 1, wherein the mineral fillers include talc.

14. A process for manufacturing a temperable lacquered substrate made of glass or glass-ceramic as claimed in claim 1, comprising:
    depositing a coating layer based on a mineral paint comprising an aqueous alkaline silicate solution, mineral fillers and at least one pigment over the entirety or some of at least one of the faces of said substrate, wherein the mineral paint comprises an additive liable to liberate oxygen at a temperature above 300° C., said additive being chosen from an alkaline nitrate or an alkaline sulfate; and
    drying said layer, in a single step, at a temperature such that the coated substrate undergoes no mechanical deformation and remains cuttable.

15. The process as claimed in claim 14, wherein the drying is carried out at a temperature below 500° C.

16. The process as claimed in claim 15, wherein the temperature is below 400° C.

17. The process as claimed in claim 16, wherein the temperature is below 200° C.

18. The process as claimed in claim 14, wherein said paint is devoid of adhesion promoter.

\* \* \* \* \*